United States Patent [19]
Owen

[11] 3,907,663
[45] Sept. 23, 1975

[54] CONVERSION OF HYDROCARBONS
[75] Inventor: Hartley Owen, Belle Mead, N.J.
[73] Assignee: Mobil Oil Corporation, New York, N.Y.
[22] Filed: Oct. 1, 1973
[21] Appl. No.: 402,237

[52] U.S. Cl. ................. 208/70; 208/100; 208/155; 208/164; 260/673
[51] Int. Cl.² C10G 37/06; B01J 8/24; B01J 29/28; C01B 33/28
[58] Field of Search...... 208/70, 120, 671 R, 671 C, 208/673, 100

[56] References Cited
UNITED STATES PATENTS

| | | | |
|---|---|---|---|
| 3,380,911 | 4/1968 | Owen | 208/74 |
| 3,748,251 | 7/1973 | Demmel et al. | 208/74 |
| 3,756,942 | 9/1973 | Cattanach | 208/137 |
| 3,758,403 | 9/1973 | Rosinski et al. | 208/120 |
| 3,760,024 | 9/1973 | Cattanach | 260/673 |

Primary Examiner—Delbert E. Gantz
Assistant Examiner—G. E. Schmitkons
Attorney, Agent, or Firm—Charles A. Huggett; Carl D. Farnsworth

[57] ABSTRACT

A process for converting hydrocarbons by a combination of fluid catalytic cracking and alkylation or aromatization of at least a part of the cracked product by contacting a hydrocarbon chargestock with a mixture of cracking catalyst and ZSM-5 type catalyst under cracking conditions; separating the mixture of cracking catalyst and ZSM-5 type catalyst from the cracked product; contacting at least a part of the cracked product with fresh ZSM-5 type catalyst under alkylation or aromatization conditions; separating the ZSM-5 type catalyst from the alkylated or aromatized product; and combining the ZSM-5 type catalyst separated from the alkylation and aromatization step with the mixture of cracking catalyst and ZSM-5 type catalyst.

10 Claims, 1 Drawing Figure

CONVERSION OF HYDROCARBONS

BACKGROUND OF THE INVENTION

FCC units were first employed commercially in the early 1940's. Since that time continual improvements in design have made the fluid catalytic process one of the most widely used conversion processes in the petroleum industry. Recently discovered catalyst compositions require further modifications of existing hydrocarbons processing methods and design in order to best utilize the particular characteristics of these newly discovered catalysts, thereby improving the refining of hydrocarbon feedstocks. The present invention deals with such hydrocarbon processing modifications.

There has recently been discovered a certain novel class of crystalline aluminosilicate zeolites which have been shown to have most unusual properties. One member of this class of zeolites has been designated ZSM-5. This is also the name that has been given to this whole class of zeolites having this community of unusual properties.

The class of zeolites referred to herein as ZSM-5 type includes not only ZSM-5 itself but also ZSM-11, ZSM-21 and other similarly behaving materials. Recently issued U.S. Pat. No. 3,702,886 describing and claiming ZSM-5 is incorporated herein by reference.

ZSM-11 generally corresponds to the empirical formula:

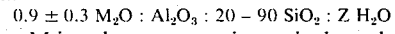
0.9 ± 0.3 M₂O : Al₂O₃ : 20 – 90 SiO₂ : Z H₂O where M is at least one cation, $n$ is the valence of M and Z is 6 to 12 in the "as produced" zeolite. The preferred M is alkali metal or alkyl ammonium or a mixture thereof, preferably sodium or tetraethylammonium. ZSM-11 is more particularly described in U.S. application Ser. No. 31,421 filed Apr. 23, 1970, and now U.S. Pat. No. 3,709,979, the entire contents of which are incorporated herein by reference.

In a preferred synthesized form, the ZSM-21 zeolite has a formula, in terms of mole ratios of oxides and in the anhydrous state, as follows:

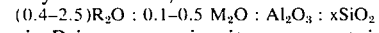
(0.4–2.5)R₂O : 0.1–0.5 M₂O : Al₂O₃ : xSiO₂ wherein R is an organic nitrogen containing cation, especially a cation derived from ethylenediamine, pyrrolidine or 2-(hydroxyalkyl) trialkylammonium compounds, wherein alkyl is methyl, ethyl or a combination of the two, M is an alkali metal, especially sodium, and $x$ is from greater than 10 to about 50.

Reference is made to U.S. Pat. application Ser. No. 253,942 filed May 17, 1972, now U.S. Pat. No. 3,756,942, for a more complete description of the various specific catalysts in the ZSM-5 class and for methods of preparing such.

In general, some zeolite molecular sieves have in the past been characterized as shape selective, that is, having pore openings so sized and shaped as to admit substantially only normal paraffins into their internal pore structure, or non-shape selective or large pored, that is having pore openings so sized and shaped as to admit substantially any configuration of organic compound into their internal pore structure. It has become usual in this art to refer to shape selective zeolites as those having pore openings of about 5 to 7 Angstrom units or less and to non-shape selective zeolites as those having pore openings of about 11 Angstrom units or more.

The ZSM-5 type of zeolite molecular sieve seems to differ from these other materials in that it is shape selective not only for normal paraffins but for slightly branched, e.g. methyl substituted, paraffins as well. They have the remarkable and unique ability to admit and act upon those compounds having effective diameters equivalent to methyl substituted normal paraffins. Another remarkable and unique attribute of ZSM-5 type of zeolites is their ability to convert aliphatic hydrocarbons to aromatic hydrocarbons in exceptionally fine, commercially attractive yields by simply contacting such paraffins with such catalyst at high temperatures of about 800° to 1500°F and low space velocities of about 1 to 15 WHSV. ZSM-5 type of zeolite seems to exert little or no action upon aromatic rings present in the feed to such process or formed in such process from the point of view of destroying (cracking) such rings. It does however have the ability, with or without the presence of a special hydrogen transfer functionality and with or without the presence of added hydrogen in the reaction mixture, to cause paraffinic feed components, to alkylate aromatic rings of somewhat lower temperatures of up to about 800° to 1000°F. It appears that the operative ranges for alkylation and formation of new aromatic rings overlap but that the optimum ranges are distinct, aromatization being at a high temperature. The exact mechanisms for these catalytic functions are not fully known or completely understood.

As previously described, conventional FCC operations involve the cracking of very large hydrocarbon molecules into smaller molecules, thereby maximizing the amount of lighter molecules which boil in the gasoline range. However in such a process some hydrocarbon fractions lighter than those which boil in the gasoline range (generally those molecules with four carbon atoms or less) are produced. Such small molecules are produced for example when fragments containing only one or two carbon atoms are cracked away from a larger molecule. Hydrocarbon fractions having a boiling range lower than gasoline may also be produced due to excessive cracking when for example a molecule initially cracked into one having six carbon atoms is cracked into two molecules each having three carbon atoms.

Additionally, while the gasoline range product produced by the FCC process is an excellent gasoline blend component, (that is to say that its octane value is quite good) the octane of the FCC gasoline range product may be further improved through aromatization.

It is clear that the aromatization of hydrocarbon streams, such as FCC light ends, is desirable as a means to increase the value of such hydrocarbon streams. As aromatization and alkylation temperatures and pressures with ZSM-5 catalysts are within the range of those experienced in FCC cracking, employment of a ZSM-5 type catalyst for this purpose is very desirable.

As a result of complex hydrocarbon processing reactions in an FCC reactor, a carbonaceous deposit is laid down on the catalyst present which is referred to by petroleum engineers as "coke". The deposit of coke on the catalyst tends to seriously impair the catalyst efficiency for the principal reaction desired and to substantially decrease the rate of conversion and/or the selectivity of the process. Thus it is common to remove the catalyst after coke has been deposited thereon and to regenerate it by burning the coke in a stream of oxidizing gas. The regenerated catalyst is returned to the conversion stage of the process cycle. (Thus the excellent thermal stability of ZSM-5 type catalysts and FCC cracking catalysts are of great importance).

The amount of coke laid down on the catalyst is to a certain extent a function of variables such as catalyst crystalline structure and chemical composition, feedstock, catalyst-oil contact time, and the pressure and temperature at which the cracking reaction is carried out. Thus while it might be desirable to employ both FCC cracking catalyst, e.g. of the faujasite type and ZSM-5 type catalysts in a cracking operation, due to the different crystalline structures of the two catalyst types, they will experience coke lay down at different rates under a given set of operating conditions. Thus one may become inactive due to coke deposition and require regeneration while the other is still active.

Typical commercial applications of fluid catalytic cracking units employ a rather heavy gas oil charge and X or Y type faujasite catalyst. Catalyst-oil contact times of a few seconds produce rather heavy coking of the faujasite. When ZSM-5 type catalysts are employed in a process as described above, they do not coke as rapidly as the faujasite catalyst, primarily because of their small pore diameter which prevents entry of a substantial amount of the hydrocarbon molecules in the heavy gas oil chargestock.

Another characteristic which distinguishes ZSM-5 type catalysts from faujasite is their ability to convert hydrocarbons very satisfactorily when in a fresh and unregenerated state. Due to the very high activity of the faujasite catalyst, an FCC unit may not be "started-up" with all fresh faujasite catalyst, as it would coke too rapidly due to the high initial activity. Therefore conventional start-up operations of units employing faujasite catalyst utilize either regenerated or steamed catalyst which is somewhat less active. ZSM-5 type catalysts on the other hand, while also more active in a fresh regenerated or steamed state, is not so initially active as to render it unusable. Indeed fresh ZSM-5 type catalyats perform in a superior manner to regenerated or steamed ZSM-5 type catalysts in some hydrocarbon conversion processes.

Table 1 illustrates the effect of such steaming on the ability of a ZSM-5 type zeolite to catalize the aromatization of olefins. Example 1 illustrates the ability of fresh ZSM-5 type zeolite to catalize the azomatization of olefins. Example 2 shows how this ability is decreased when similarly prepared ZSM-5 type zeolite is steamed prior to being utilized to aromatize the olefin feedstock.

Table 1

Effect of Steaming on Aromatization Over ZSM-5 Catalysts

| Charge | Propylene | Propylene |
|---|---|---|
| Example | 1 | 2 |
| Catalyst | HZSM-5 KS5737 | HZSM-5 SR-20 |
| Run No. | DG1011-1 | DG1017-1 |
| Hrs. on Stream | 1 | 1 |
| Temperature | 1100/950[1] | 1100/950 |
| WHSV | 0.4/0.4 | 0.51/0.51 |
| Wt. % Recovered | 102.2 | 91.1 |
| Based on Recovered Product | | |
| Wt. % Liq. Prod. | 61.9 | 40.8 |
| Wt. % Arom. in Liq. | 98.7 | 62.1 |
| Av. Mol Wt. Arom | 92.7 | 101.8 |
| Wt. % Olefins to Arom. | 70.9 | 41.1 |
| Calc. Based on 100 g. Recovered | | |
| $C_1$ | 10.8 | 2.3 |
| $C_2$ | 1.6 | 11.3 |
| $C_2=$ | 10.0 | 1.9 |
| $C_3$ | 7.1 | 19.0 |

Table 1-Continued

Effect of Steaming on Aromatization Over ZSM-5 Catalysts

| $C_3=$ | 7.2 | 9.2 |
|---|---|---|
| $C_4$ | 0.6 | 8.7 |
| $C_4=$ | 0.6 | 4.8 |
| $C_5$ | — | 1.3 |
| $C_5=$ | 0.2 | 0.6 |
| Paraffins in Liq. | 0.8 | 15.7 |
| Benzene | 18.8 | 2.4 |
| Toluene | 24.8 | 7.5 |
| Xylene | 8.9 | 8.2 |
| Total $C_9$ | 2.1 | 4.8 |
| Indane | 0.4 | 0.5 |
| Total $C_{10}$ | 0.8 | 1.2 |
| Nephthalene | 1.4 | — |
| Total $C_{11}$ | 3.7 | 0.4 |

[1]Where the temperature is listed as 1100/950 the catalyst bed is split in two halves; the first at 1100°F, the second at 950°F.

A purpose of this invention is to provide a method of hydrocarbon conversion wherein only fresh ZSM-5 type catalyst is utilized in the upgrading portion of the process. Another purpose of this invention is to retain the ZSM-5 type catalyst in a reactor utilized for such upgrading until the ZSM-5 type catalyst has become deactivated due to the deposition of coke on its surface. A further purpose of this invention is to provide a method of hydrocarbon conversion whereby hydrocarbon product is upgraded by aromatization or alkylation wherein only fresh ZSM-5 type catalyst is utilized. A purpose of this invention is to provide a method of aromatization of a predominantly olefinic feedstream utilizing only fresh ZSM-5 type catalyst in an upgrading reactor. A further purpose of this invention is to provide a method of hydrocarbon conversion wherein the ZSM-5 type catalyst utilized in an upgrading reactor is not contacted with steam while in the fresh or unregenerated or unsteamed state. A further purpose of this invention is to utilize the spent catalyst, regenerated catalyst or flue gas to heat the hydrocarbon feedstock converted in an upgrading reactor. Other and additional objectives or purposes of this invention will become obvious from a consideration of the entire specification including the drawing and claims.

SUMMARY OF THE INVENTION

This invention relates to a method of hydrocarbon conversion operation which utilizes two substantially different crystalline zeolite catalysts. The invention comprises a dual reactor system, wherein a crystalline zeolite cracking catalyst suitable of the X or Y faujasite variety, combined with regenerated ZSM-5 type zeolite catalyst is employed in one reaction zone, and only fresh ZSM-5 crystalline zeolite type catalyst is employed in a second reaction zone; each performing in coordination with the other and making a contribution in the overall production of high yields of more desirable hydrocarbon product including those hydrocarbon streams in the gasoline boiling range.

This invention contemplates the crystalline zeolite cracking catalyst, such as the large pore X or Y type faujasite variety being utilized in a first reactor or reaction zone, e.g. an FCC riser, as it is now typically employed commercially: namely, operation of a reactor temperature of about 900°F to 1,200°F at about 1 to 10 atmospheres pressure, and a catalyst/oil contact time of about 1–5 seconds wherein the X or Y type faujasite catalyst is contacted with a feedstock comprised of one or more of the following refinery hydrocarbon streams: coker and/or crude unit gas oil, vacuum tower overhead, kerosine, etc., the feedstock having an API gravity range of between about 10 to 50.

Fresh ZSM-5 type zeolite is utilized for upgrading in a second reactor which has a temperature range of about 500°F to 1100°F, and about 1 to 10 atmospheres pressure, and about 0.1 to 80 WHSV space velocity, wherein the hydrocarbon feedstocks are upgraded by a combination of shape selective cracking, alkylation and aromatization operations.

The utilization of this second reactor, wherein only fresh ZSM-5 type catalyst is contacted with a hydrocarbon feedstock, will allow the ZSM-5 type catalyst to be retained in the second reactor for an extended time until it has become deactivated due to the deposition on its surface of hydrocarbonaceous material or otherwise, rather than being passed into a regenerator prematurely, as would be the case if the ZSM-5 were simply mixed with conventional X or Y type faujasite catalyst and utilized in a conventional fluid catalytic cracking operation without further method modification. The utilization of this second reactor also allows for the avoidance of contacting the fresh ZSM-5 catalyst with steam prior to its entry into the second reactor.

The hydrocarbon feedstock or the second reactor itself may be heated to the operating temperature through heat transfer with the spent catalyst from the first reactor, the regenerated catalyst or the regenerator flue gas. Alternately the total heat of reactor 2 may be supplied by heating the feedstock to reactor 2 in an external furnace.

The ZSM-5 type catalyst may be retained in the second reactor through control of the second reactor operating conditions of temperature, pressure and contact time. Mechanical means may also be utilized to retain the ZSM-5 type catalyst in the second reactor, so that it may be fully utilized prior to deactivation due to hydrocarbonaecous material formation of its surface. One such means employs the use of a separator to disengage the ZSM-5 type catalyst from the hydrocarbon product produced during the conversion reaction. A second mechanical design utilizes a reactor vessel wherein the upper portion has a diameter larger than the lower portion thus allowing for a decrease in the velocity of the ZSM-5 type catalyst and hydrocarbon product and therefore allowing the heavier ZSM-5 type catalyst to remain in the reactor rather than being carried out of the reactor by the hydrocarbon product.

BRIEF DESCRIPTION OF THE DRAWINGS

The FIGURE is a schematic drawing illustrating a reactor-regenerator system utilized according to the disclosure of this invention.

DESCRIPTION OF SPECIFIC EMBODIMENTS

Figure 1:
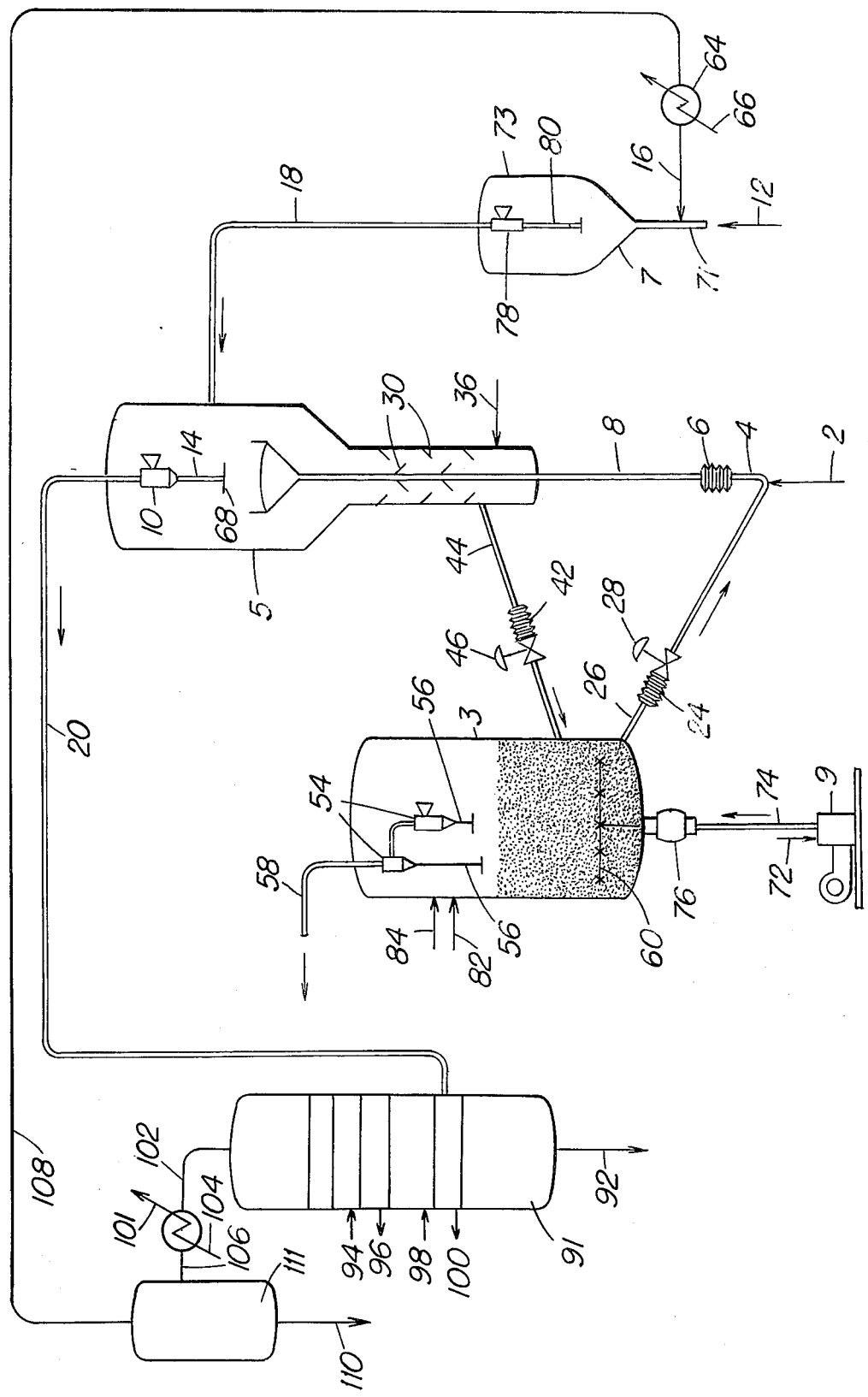

In the specific arrangement of the FIGURE, a feed, such as 650° to 1000°F gas oil, is introduced into a first reactor 8 through a conduit 2, hot regenerated X or Y type faujasite catalyst mixed with regenerated ZSM-5 type zeolite (preferably a minor proportion thereof) is passed from a regenerator 3 through a line 26, an expansion joint 24 and a slide valve 28. The catalyst and oil mix at a point 4 and pass upward through an expansion joint 6 and a riser section 8 of the first vessel 5, maintained at a temperature of about 900–1200°F and at a pressure of 1–5 atmospheres. The oil is cracked to light and heavy hydrocarbon components in the riser 8, and during this cracking operation hydrocarbonaceous material is deposited on particularly the faujasite catalyst. The hydrocarbon vapors leave the first vessel 5 through a separator 10. The separator 10 removes catalyst entrained in the vapor and returns the catalyst to the first vessel through a dipleg 14. The dipleg 14 is typically employed as there is a pressure drop through the separator 10, thus flowing catalyst having passed through the separator 10 is at a low pressure relative to the surrounding catalyst outside the separator. The dipleg 14 allows this catalyst which has passed through the separator to accumulate and develop a pressure head so that when the pressure head is sufficient to force open a flapper 68 that is normally biased in the sealed position, the catalyst flow will be downward. A reversal of flow up the dipleg 14 would cause the separator 10 to cease operating.

Hydrocarbon vapors produced in the first reactor 8, and having been separated from catalyst by the separator 10, pass through line 20 into a distillation column 91. Gasoline boiling range gases are passed through an overhead line 102 and through a heat exchanger 101 wherein the gases are cooled by a cooling media such as air which passes through a line 104. This cooling in the heat exchanger 101 condenses some of the gases into liquid. The gas and liquid mixture next passes through a line 106 into a distillation column receiver 111. Liquid gasoline boiling range product is removed through a line 110. Gases are removed through a line 108 (generally $C_4$ minus) and are further processed.

The heaviest hydrocarbon product in the distillation column 91 passes out through line 92. This heavy product is often recracked in the riser of the first vessel 5 or is further processed to produce carbon black.

A light cycle oil stream may be removed from the distillation column by a line 96 and returned by a line 94. A heavier cycle oil stream may be removed by a line 100 and returned by a line 98. Each of these streams may be utilized as a source of heat in related refinery operations, both the cycle streams being at a lower temperature upon their return to the distillation column 91. A portion of the cycle oil streams, preferably the light cycle oil stream, may be used as a hydrocracker feedstock.

The catalyst disengaged by the separator 10 passes down the outside of the riser 8 across baffles 30 and into a reactor standpipe 44. Steam may be introduced into the first vessel 5 through line 36, such steam rises outside the riser 8 in the first vessel 5 countercurrent to the downwardly falling coked catalyst. This steam flow strips hydrocarbon vapors from around the catalyst as it passes upward in the first vessel 5 counter current to the catalyst. Spent or coked catalyst leaving the first vessel 5 through the reactor standpipe 44 passes through an expansion joint 42 and a slide valve 46 and into a regenerator 3.

Air enters an air blower 9 through a suction line 72 and is discharged under pressure through line 74 and into the regenerator 3 where the air is distributed through a regenerator air grid 60. The air supports the combustion within the regenerator where the carbon in form of coke is burned off the "spent" catalyst producing "regenerated" catalyst. During startup, when the catalyst has cooled to near ambient temperatures, fuel may be burned in a heater 76 in order to produce the heat necessary to reach the combustion temperature of the carbon deposited on the spent catalyst. Once this temperature is reached, large amounts of heat are generated by the burning of the coke and the heater 76 need no longer by utilized. Combustion products termed flue gas such as carbon dioxide, carbon monoxide and water in the form of steam are disengaged from catalyst particles by separators 54 and exit the regenerator 3 through an overhead line 58. The catalyst is returned to the lower portion of the regenerator 3 through diplegs 56. Water and steam are injected through lines 82 and 84 respectively into the regenerator 3 for quenching purposes only during an upset condition when excessive temperatures exist in the regenerator.

Regenerated catalyst passes through a regenerator standpipe 26, an expansion joint 24 and a slide valve 28 prior to being joined with the incoming unit feedstock in the riser at point 4. Steam may be injected into the expansion joint 24 and the slide valve 28 during normal operation in order to prevent their operation from being impaired due to catalyst plugging. Steam may also be injected into expansion joints 6 and 42 and slide valve 46. Small amounts of steam may also be injected at various instrument locations in the reactor regenerator circuit to prevent the instruments from becoming plugged. The portion of this specific hydrocarbon conversion operation arrangement thus far defined is typical of a commercial operation as it is now practiced. As has been pointed out in the preceding portion of the disclosure, the catalyst may be contacted with steam at various points through the system.

Fresh catalyst of the ZSM-5 crystalline zeolite type is introduced into a separate and distinct reactor inlet portion 71 of a second reactor 7 through a line 12. A hydrocarbon feedstream to be acted upon by the ZSM-5 type zeolite may be passed through line 16 and then combined with the ZSM-5 type catalyst. The incoming hydrocarbon feedstreams may be heated in a heat exchanger 64 wherein the hydrocarbon stream is heated by a source of heat which flows through line 66. Whether or not this heating is required is a function of the olefins content of the feed to this second reactor 7. Olefins aromatize upon contact with ZSM-5 type zeolite exothermically while the aromatization of paraffins is endothermic. Thus the feed composition determines the heat requirements of this second reactor 7. In a preferred embodiment, the hydrocarbon stream contacted with the ZSM-5 catalyst and thereby aromatized is comprised primarily of aliphatic material and such aliphatic charge is heated to a temperature of about 800°F to 1100°F, a pressure of about 1 to 10 atmospheres and a space velocity of about 1 to 15 WHSV. The heating may be accomplished by utilizing heat exchanger 64 which might utilize as a source of heat hot flue gases from line 58 or hot catalyst from the regenerator 3 or reactor 5, or by heating the aliphatic charge in a furnace (not shown).

In a preferred embodiment, a portion or the entirety of the overhead stream 106 of the distillation column 91 is passed to the second reactor 7 through the inlet line 16. Such a stream would contain both gasoline range and lighter hydrocarbon products which could be aromatized by a ZSM-5 type catalyst as previously defined. The aromatic product produced might be alkylated with a portion or the entirety of the light gases of the line 108 ($C_4$ minus) from the distillation column overhead receiver using a ZSM-5 type catalyst, such gases might be compressed prior to their treatment in the second reactor 7.

It should be noted that there are numerous refinery processes streams which might be acted upon by a ZSM-5 type catalyst in the second reactor 7. Those referred to are simply illustrative hydrocarbon streams. A fluidized-fixed-bed reactor allows fresh ZSM-5 type catalyst to be utilized for upgrading FCC unit products through alkylation and/or aromatization prior to the ZSM-5 catalyst being added to the FCC cracking catalyst.

Various methods are envisioned by this invention for the retention of the ZSM-5 type catalyst in the second reactor 7. One such method is to design the second reactor such that its diameter is substantially larger in an upper portion 73 than a lower portion 71. The ratio of the diameters might be as high as about 5 to 1. This would allow for the velocity of the hydrocarbon vapors and ZSM-5 type catalyst particles to decrease thereby allowing for a disengagement of the hydrocarbon vapors from the heavier ZSM-5 type catalyst particles. Another method would be to install a separator 78 with a dipleg 80 in the upper portion of the second reactor 7 wherein the ZSM-5 type catalyst is separated from the hydrocarbon vapors which pass into the first vessel 5 through the line 18 and thence through the separator 10 and into the overhead line 20.

Lastly the operating conditions of the second reactor 7 may be used to govern the time of ZSM-5 type catalyst retention. The particular temperature, pressure and ZSM-5 type catalyst hydrocarbon charge contact time may be used to govern how long the ZSM-5 type catalyst remains in the second reactor 7. The operating conditions for various preferred specific embodiments have been referred to earlier in this disclosure.

An operating life will be reached where the ZSM-5 type reaches undesired low catalyst activity due to coke deposition on the catalyst or otherwise. The operating conditions and/or mechanical means may be controlled so that an amount of spent ZSM-5 type catalyst passes out of the second reactor 7 through the overhead line 18 and into the first vessel 5 where it will mix with the faujasite catalyst and eventually pass into the regenerator 3 where the ZSM-5 type catalyst will also be regenerated. The FCC catalyst mixture will then enter the first reactor 8 where they both will be utilized to convert the feedstock charged through a line 2 to the first reactor 8 The amount of ZSM-5 type catalyst loss due to attrition will be replaced with fresh ZSM-5 type catalyst through the line 12. This make up with fresh ZSM-5 type catalyst through the line 12 could be as high as 100 percent per day depending upon the space velocity produced by the vessel operation conditions.

Utilization of the second reactor 7 allows for the fresh ZSM-5 type catalyst to be utilized for hydrocarbon conversion while also preventing its contact with steam, which to a certain extent deactivates the catalyst, until the ZSM-5 type catalyst has become inactivated due to carbon deposited on its surface.

Having provided general discussion of the present invention and described specific embodiments in support thereof, it is understood that modifications obvious to those skilled in the art are included within the spirit of this invention, and no undue restrictions are to be imposed by reasons thereof except as provided by the following claims.

What is claimed is:

1. A method for converting relatively high and low boiling hydrocarbons to gasoline boiling range materials which comprises, cracking gas oil boiling range hydrocarbons in a cracking zone in the presence of a regenerated dual-component cracking catalyst comprising a ZSM-5 type of crystalline zeolite under elevated temperature cracking conditions selected to form gasoline boiling range components and lower boiling gaseous hydrocarbons comprising olefins and paraffins, separating the gaseous hydrocarbons from gasoline boiling range components and passing the gaseous hydrocarbons in contact with a separate mass of ZSM-5 type zeolite catalyst having activity for cyclizing and aromatizing said gaseous hydrocarbons to form aromatics, combining the hydrocarbon product of gaseous hydrocarbon aromatizing step with a product of said gas oil cracking before separating the products thereof, passing catalyst used in said gas oil cracking to catalyst regeneration, and cascading ZSM-5 type zeolite catalyst from said mass of catalyst used in said aromatizing step operation to said gas oil cracking as required.

2. The method of claim 1 wherein the gaseous hydrocarbons separated from the combined products are aromatized at a temperature within the range of about 600°F. to about 1100°F. at a pressure in the range of 1 to 10 atmospheres and a space velocity in the range of about 0.1 to about 80 wt. hourly space velocity.

3. The method of claim 1 wherein heat is provided to said aromatizing by one of (1) preheating of the feed reactant (2) indirect heat exchange with hot regenerated catalyst of said gas oil cracking and (3) indirect heat exchange with hot flue gases obtained from regenerating the catalyst of the gas oil cracking.

4. The method of claim 1 wherein said gas oil cracking occurs in a riser conversion zone and said aromatizing occurs in a separate dense fluid-catalyst-bed reaction zone and fresh ZSM-5 type zeolite is used first in said dense fluid catalyst bed before transfer to said gas oil cracking.

5. The method of claim 1 wherein said gaseous hydrocarbons from gas oil cracking are composed of $C_4$ and lighter hydrocarbons.

6. The method of claim 1 wherein a combined product of cracking and aromatizing comprises $C_5$ to 400°F. boiling range hydrocarbons.

7. The method of claim 1 wherein said ZSM-5 type zeolite has activity for alkylating aromatics at a temperature in the range of about 100°F. to 700°F. at a pressure in the range of 1 to 10 atmospheres and a space velocity of about 0.1 to 20 WHSV.

8. The method of claim 7 wherein products of the combination operation comprises incompletely reacted paraffinic fragments and aromatic hydrocarbons which are recycled to said mass of ZSM-5 type zeolite as reactant material to form alkyl aromatics.

9. The method of claim 1 wherein cascade of the ZSM-5 type zeolite is accomplished when regeneration of the mass of ZSM-5 type zeolite catalyst is required.

10. The method of claim 1 wherein cascade of the ZSM-5 type catalyst to the gas oil cracking operation is performed to maintain the ZSM-5 zeolite level of the gas oil cracking catalyst at a predetermined level.

* * * * *

UNITED STATES PATENT AND TRADEMARK OFFICE
CERTIFICATE OF CORRECTION

PATENT NO. : 3,907,663
DATED : September 23, 1975
INVENTOR(S) : HARTLEY OWEN

It is certified that error appears in the above—identified patent and that said Letters Patent are hereby corrected as shown below:

Col. 3, line 38     "fresh regenerated" should be --fresh than regenerated--.

Col. 4, line 32     "reacter" should be --reactor--.

Col. 4, line 62     "1.200°F" should be --

Col. 7, line 46     "ZSM-5 catalyst" should be --ZSM-5 type catalyst--.

Signed and Sealed this twenty-seventh Day of January 1976

[SEAL]

Attest:

RUTH C. MASON
Attesting Officer

C. MARSHALL DANN
Commissioner of Patents and Trademarks